(12) United States Patent
Peyton et al.

(10) Patent No.: US 11,739,854 B2
(45) Date of Patent: Aug. 29, 2023

(54) VALVE ASSEMBLY FOR AN AIR CUSHION

(71) Applicant: PERMOBIL, INC., Lebanon, TN (US)

(72) Inventors: Ross Peyton, O'Fallon, IL (US); Kevin Meier, St. Louis, MO (US); David Hopp, Edwardsville, IL (US); Steven Long, Edwardsville, IL (US); Steven DuFresne, Hartland, WI (US)

(73) Assignee: PERMOBIL, INC., Lebanon, TN (US)

( * ) Notice: Subject to any disclaimer, the term of this patent is extended or adjusted under 35 U.S.C. 154(b) by 0 days.

(21) Appl. No.: 17/571,052

(22) Filed: Jan. 7, 2022

(65) Prior Publication Data
US 2023/0220921 A1 Jul. 13, 2023

(51) Int. Cl.
*F16K 15/20* (2006.01)
*F16K 24/00* (2006.01)

(52) U.S. Cl.
CPC ............ *F16K 15/207* (2013.01); *F16K 24/00* (2013.01); *F16K 15/20* (2013.01); *Y10T 137/3646* (2015.04)

(58) Field of Classification Search
CPC ......... F16L 37/004; F16L 37/40; F16L 37/42; Y10T 137/3584; Y10T 137/36; Y10T 137/3646; Y10T 137/3724; Y10T 137/87861; Y10T 137/87877
See application file for complete search history.

(56) References Cited

U.S. PATENT DOCUMENTS

| | | |
|---|---|---|
| 1,371,089 A | 3/1921 | Herring |
| 2,793,057 A | 5/1957 | McGugin |
| 3,181,895 A | 5/1965 | Cator |
| 4,541,136 A | 9/1985 | Graebe |
| 5,203,831 A | 4/1993 | Lind et al. |
| 5,289,850 A * | 3/1994 | Sarson .................... F16L 37/32 137/881 |
| 6,687,936 B2 | 2/2004 | Graebe et al. |
| 6,786,131 B2 | 9/2004 | Tsai |
| 6,866,243 B2 | 3/2005 | Yang |
| 7,051,753 B1 | 5/2006 | Caires et al. |

(Continued)

FOREIGN PATENT DOCUMENTS

| | | |
|---|---|---|
| EP | 2781818 A1 | 9/2014 |
| WO | 2018087210 A1 | 5/2018 |
| WO | 2018218493 A1 | 12/2018 |

OTHER PUBLICATIONS

International Search Report and Written Opinion for Application No. PCT/US2022/053660 dated May 4, 2023 (13 pages).

*Primary Examiner* — Robert K Arundale
(74) *Attorney, Agent, or Firm* — Michael Best & Friedrich LLP

(57) ABSTRACT

An air valve assembly includes a housing defining an internal channel, a plunger member positioned in the internal channel and configured to slide relative to the housing, a biasing member positioned in the internal channel and configured to apply a biasing force onto the plunger member, a sealing member defining a first inflation aperture, the plunger member slidably received by the first inflation aperture, a second deflation aperture defined by the housing and in fluid communication with the internal channel, and a deflation control member slidably connected to the housing, the deflation control member configured to selectively seal the second deflation aperture.

33 Claims, 9 Drawing Sheets

(56) References Cited

U.S. PATENT DOCUMENTS

| | | |
|---|---|---|
| 7,487,796 B2 | 2/2009 | Imler et al. |
| 9,140,393 B2 | 9/2015 | Wolff et al. |
| 9,709,183 B2 | 7/2017 | Frayne |
| 9,863,567 B2 | 1/2018 | Lehmann et al. |
| 10,018,280 B2 | 7/2018 | Xia et al. |
| 10,125,753 B2 | 11/2018 | Poertner |
| 10,228,067 B2 | 3/2019 | Miller et al. |
| 10,359,033 B2 | 7/2019 | Hermansen et al. |
| 10,422,328 B2 | 9/2019 | Hermansen et al. |
| 10,502,351 B2 | 12/2019 | Jaeger et al. |
| 10,557,582 B1 * | 2/2020 | Khaitov .............. F16K 7/20 |
| 10,641,403 B2 | 5/2020 | Maxfield et al. |
| 10,697,446 B2 | 6/2020 | Winefordner et al. |
| 10,969,046 B2 | 4/2021 | Leidefeldt |
| 11,046,129 B2 | 6/2021 | Chou et al. |
| 2005/0218367 A1 | 10/2005 | Shinner |
| 2005/0274831 A1 * | 12/2005 | Burdick ............... F16K 1/38 |
| | | 239/581.2 |
| 2006/0162796 A1 * | 7/2006 | Lee-Liao .......... F16K 17/0486 |
| | | 137/881 |
| 2006/0289070 A1 | 12/2006 | Alley et al. |
| 2011/0084474 A1 | 4/2011 | Paden et al. |
| 2012/0013117 A1 | 1/2012 | Bernshtein |
| 2016/0223095 A1 | 8/2016 | Sando et al. |
| 2017/0335975 A1 | 11/2017 | Shen |
| 2018/0038534 A1 | 2/2018 | Jaeger et al. |
| 2018/0066779 A1 | 3/2018 | Jaeger et al. |
| 2020/0116284 A1 | 4/2020 | Ashida et al. |

\* cited by examiner

VALVE ASSEMBLY FOR AN AIR CUSHION

FIELD OF THE DISCLOSURE

The present disclosure relates to an inflatable air cushion. More specifically, the present disclosure relates to a valve assembly for use with an inflatable air cushion that includes at least one inflation zone. The valve assembly is configured to selectively facilitate inflation or deflation of the at least one inflation zone of the air cushion, improving inflation control and ease of use for a user.

BACKGROUND

Individuals who are confined to wheelchairs are at higher risk of tissue breakdown and the development of pressure sores, which can be difficult to treat and/or cure. In certain circumstances, much of an individual's weight can concentrate in the region of the ischium, which includes the ischial tuberosity, or the bony prominence of the buttocks. Without regular movement, the flow of blood to the skin tissue in these regions can decrease, leading to the tissue damage and the development of pressure sores. Inflatable cellular air cushions are generally known to improve distribution of weight and thus provide protection from the occurrence of tissue damage and pressure sores. These cushions can include an array of air cells that project upwardly from a common base. Within the base the air cells are configured to communicate with each other, and thus, all exist at the same internal pressure. Hence, each air cell exerts essentially the same restoring force against the buttocks, irrespective of the extent to which it is deflected. U.S. Pat. No. 4,541,136 discloses such a cellular cushion currently manufactured and sold by Permobil, Inc. of Lebanon, Tenn., USA for use on wheelchairs. Known inflatable cellular air cushions generally utilize a Schrader valve for an inflation and deflation valve. While reliable for maintaining a desired inflation level, a Schrader valve has certain limitations. For example, a Schrader valve generally includes an externally threaded tube to facilitate a connection with an air supply (e.g., an air pump, etc.). Engaging the connection can be difficult for a user confined to a wheelchair, as the user can have difficulty accessing and/or connecting (or disconnecting) the air supply to the Schrader valve. Further, inflation with a Schrader valve requires a pump or other high pressure air supply device. As such, inflation of the cellular air cushions requires connection of an air pump. In addition, a Schrader valve can be difficult to facilitate deflation and control a rate of deflation. A user must rotate a portion of the Schrader valve or facilitate depression of a small internal core of the Schrader valve, to deflate the cellular air cushion. This can be difficult for some users, including those with dexterity limitations. In addition to being difficult to depress, the rate of air discharge is not readily controllable. This can lead to undesired excess deflation, resulting in the cellular air cushion being underinflated. Accordingly, there is a need for an air valve that improves a connection to an air supply, that can facilitate air inflation without an air pump, and can improve deflation control for a user.

SUMMARY

In one example of an embodiment, an air valve assembly includes a housing defining an internal channel, a plunger member positioned in the internal channel and configured to slide relative to the housing, a biasing member positioned in the internal channel and configured to apply a biasing force onto the plunger member, a sealing member defining a first inflation aperture, the plunger member slidably received by the first inflation aperture, a second deflation aperture defined by the housing and in fluid communication with the internal channel, and a deflation control member slidably connected to the housing, the deflation control member configured to selectively seal the second deflation aperture. In a first inflation configuration, the plunger member is configured to overcome the biasing force and slide relative to the first inflation aperture to facilitate a flow of air between the sealing member and the plunger member. In a first deflation configuration, the plunger member is slidably received by the first inflation aperture and the deflation control member slides relative to the housing to discharge air through the second deflation aperture.

Other aspects of the disclosure will become apparent by consideration of the detailed description and accompanying drawings.

Figure 1:
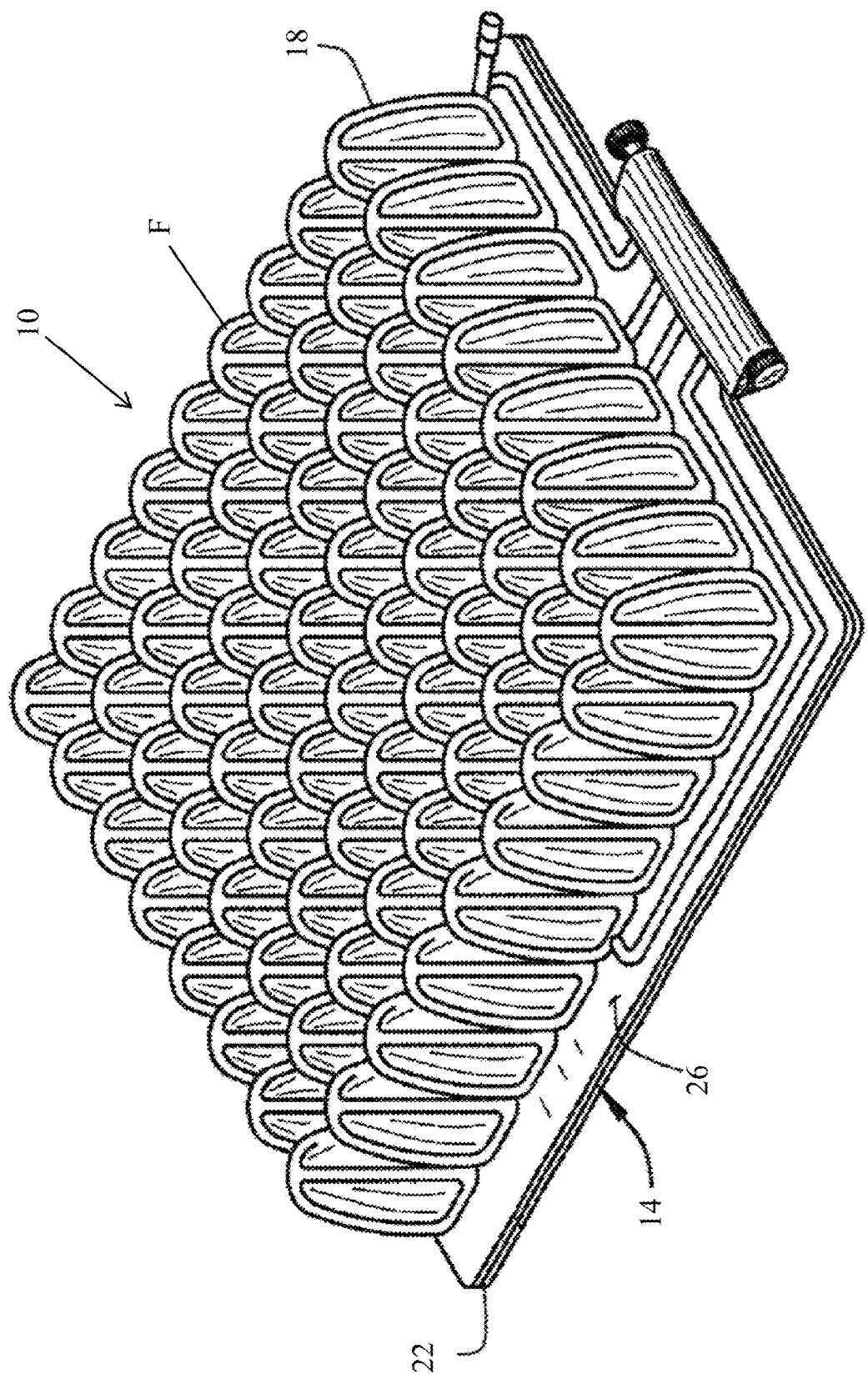
FIG. 1 is a perspective view of an example of an embodiment of a cellular cushion.

Before embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

DETAILED DESCRIPTION

The present disclosure is directed to an embodiment of an air valve assembly 200 configured for operation with a cellular cushion 10. The air valve assembly 200 is configured to selectively control inflation and deflation of at least one inflation zone 30, 34, 38, 42 of the cellular cushion 10. The air valve assembly 200 includes a first inflation configuration, where the air valve assembly 200 is configured to receive a first member 204 fluidly connected to an air pump. A magnetic connection improves attachment and detachment of an associated air pump. In conditions where an air pump is not present, the air valve assembly 200 can be inflated by a second inflation configuration, where a user can blow air into the air valve assembly 200. The air valve assembly 200 also includes a deflation control member 290 that is slidably connected to a housing 248. Deflation can be controlled by simply sliding the deflation control member 290, facilitating deflation through a deflation aperture 270 that is separate and distinct from an inflation aperture 266, 286.

With reference now to the figures, FIG. 1 is a perspective view of an example of an embodiment of a cellular cushion 10 (also referred to as a cellular air cushion 10). The cellular cushion 10 includes a base 14 and a plurality of air cells 18. The base 14 is formed of a lower layer 22 and an upper layer 26. The lower layer 22, which can also be referred to as a backing layer 22, can be coupled to the upper layer 26, for example through an appropriate adhesive, etc. In the illustrated embodiment, the lower layer 22 can be formed of a first material while the upper layer 26 can be formed of a second, different material. In one example of an embodiment, the lower layer 22 can be formed of polyurethane while the upper layer 26 can be formed of a flexible neoprene. In other examples of embodiments, the lower and upper layers 22, 26 can be formed of any material (or combination of materials) suitable for operation of the cellular cushion 10 as described herein. A suitable example of the cellular cushion 10 is disclosed in U.S. Pat. No. 4,541,136, the contents of which is incorporated by reference in its entirety.

The plurality of air cells 18 project away from the base 14. The plurality of air cells 18 are molded into the upper layer 26, and thus are defined by the upper layer 26. In addition, the upper layer 26 interconnects the plurality of air cells 18. Each of the plurality of air cells 18 include four fins F. In other examples of embodiments, each of the plurality of air cells 18 can have any suitable configuration, including but not limited to air cells 18 having any number of fins, any number of sides, or having no fins (e.g., cylindrical cells, cubical cells, rounded cells, etc.).

The plurality of air cells 18 are arranged on the upper layer 26 in a plurality of longitudinal and transverse rows. As such, each air cell 18 occupies both a longitudinal row and a transverse row. In other examples of embodiments, the plurality of air cells 18 can be arranged in any geometry suitable for providing support to a user. For example, the air cells 18 can be arranged in a semi-circular pattern, a circular pattern, or any other suitable arrangement or geometry of air cells 18.

Figure 2:
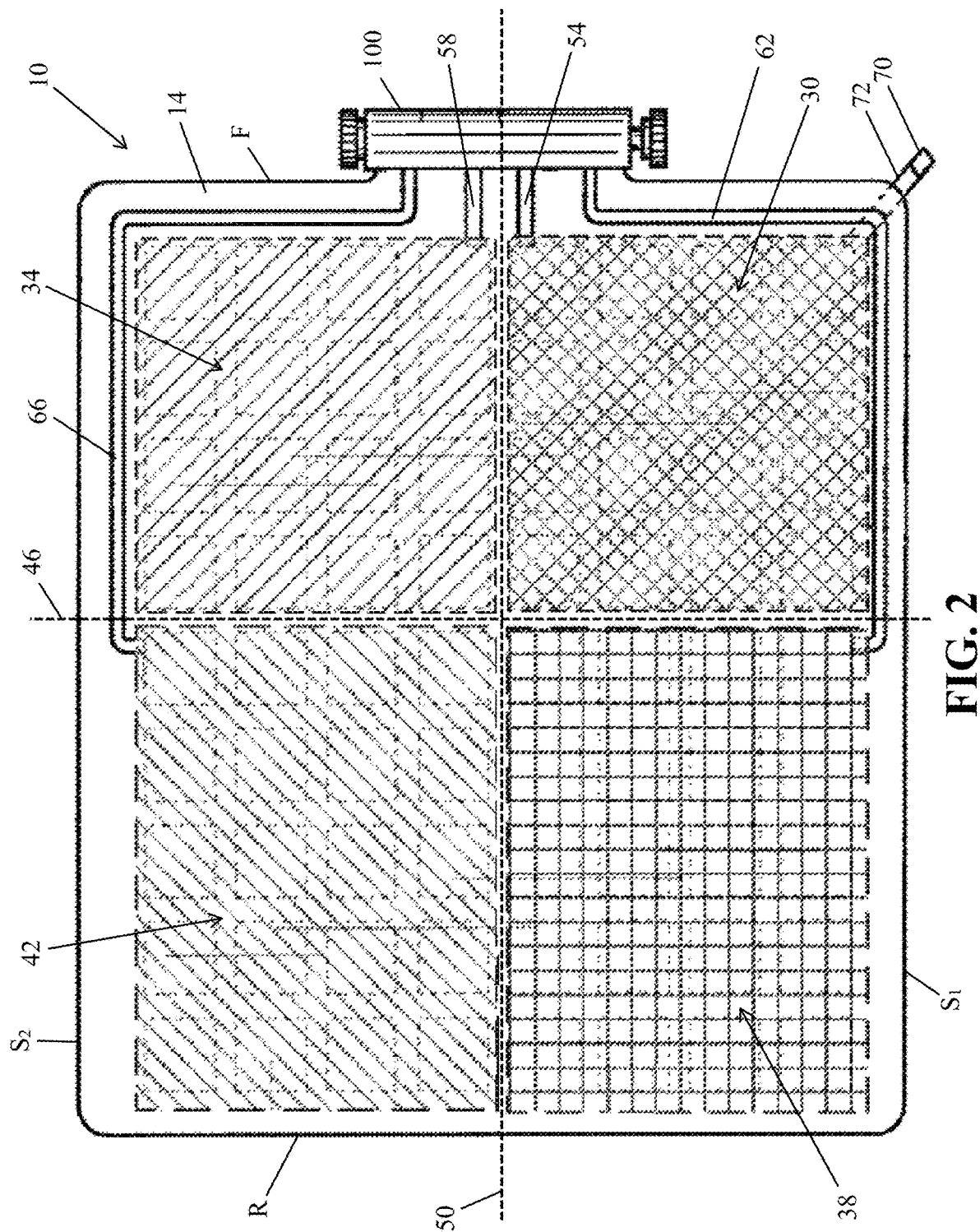
FIG. 2 is a bottom-up view of the cellular cushion of FIG. 1 with a plurality of cells removed to illustrate different zones of cells.

With reference now to FIG. 2, the cellular cushion 10 is arranged into at least one inflation zone. More specifically, the air cells 18 (shown in FIG. 1) of the cellular cushion 10 are arranged into a plurality of zones (also referred to as inflation zones). In the illustrated embodiment, the plurality of zones include four different inflation zones 30, 34, 38, 42. A first zone 30 is positioned adjacent to a second zone 34 along a first axis 46. Stated another way, the first and second zones 30, 34 are positioned side by side at a front F (or first end F) of the cellular cushion 10. A third zone 38 is positioned adjacent to a fourth zone 42 along the first axis 46. Stated another way, the third and fourth zones 38, 42 are positioned side by side at a rear R (or second end R) of the cellular cushion 10. In addition, the first zone 30 and the third zone 38 are positioned side by side along a second axis 50. Stated another way, the first and third zones 30, 38 are positioned side by side along a right side $S_1$ (or a first side $S_1$) of the cellular cushion 10. The second zone 34 and the fourth zone 42 are also positioned side by side along the second axis 50. Stated another way, the second and fourth zones 34, 42 are positioned side by side along a left side $S_2$ (or a second side $S_2$) of the cellular cushion 10. It should be appreciated that the sides (i.e., right and left sides) are described in relation to viewing the cellular cushion 10 from the front F to the rear R. When describing the sides in relation to the user sitting on the cellular cushion 10, the first side $S_1$ can be referred to as a left side, and the second side $S_2$ can be referred to as a right side. In the illustrated embodiment, the first axis 46 is generally perpendicular to (or generally orthogonal to) the second axis 50. In other embodiments of the cellular cushion 10, the zones 30, 34, 38, 42 of air cells 18 (shown in FIG. 1) can be oriented in any suitable orientation or geometry relative to each other. In addition, in other examples of embodiments, the plurality of zones can include two zones, three zones, five or more zones, or any suitable or desired number of zones. It should be appreciated that each zone 30, 34, 38, 42 includes a plurality of air cells 18 (shown in FIG. 1).

A fluid conduit 54, 58, 62, 66 (also referred to as an air conduit 54, 58, 62, 66) fluidly connects each of the plurality of zones 30, 34, 38, 42 to a valve assembly 100. A first fluid conduit 54 fluidly connects the first zone 30 to the valve assembly 100. A second fluid conduit 58 fluidly connects the second zone 34 to the valve assembly 100. A third fluid conduit 62 fluidly connects the third zone 38 to the valve assembly 100. A fourth fluid conduit 66 fluidly connects the fourth zone 42 to the valve assembly 100. It should be appreciated that each zone 30, 34, 38, 42 is generally fluidly isolated from any other zone 30, 34, 38, 42. It should be appreciated that each conduit 54, 58, 62, 66 can be formed in any suitable manner. For example, in one example of an embodiment each conduit 54, 58, 62, 66 can be molded or vacuum formed between the lower and upper layers 22, 26 of the base 14 (shown in FIG. 1).

An air valve assembly 70 (also referred to as an air valve 70) is fluidly connected to the plurality of air cells 18 (shown in FIG. 1). More specifically, the air valve 70 is fluidly connected to the first zone 30 by an air passageway 72. In other examples of embodiments, the air valve 70 can be fluidly connected to the second zone 34, the third zone 38, or the fourth zone 42. The air valve 70 is configured to facilitate inflation and deflation of the plurality of air cells 18 (or inflation and deflation of the plurality of zones 30, 34, 38, 42). For example, the air valve 70 can be configured to engage an air pump (not shown) to facilitate inflation. The air pump can be a hand pump, a manual pump, a motorized pump, or any other suitable pump that is configured to supply air to the cellular cushion 10. The air pump (not shown) can provide a flow of air to one zone, illustrated as the first zone 30. Air travels from the first zone 30 to the valve assembly 100 through the first conduit 54. The air is then distributed to the other zones 34, 38, 42 through the respective conduits 58, 62, 66 by the valve assembly 100. Similarly, the air valve 70 can be configured to deflate the plurality of cells 18 (shown in FIG. 1) of the cellular cushion 10. The air valve 70 can be opened to the atmosphere, facilitating a release of air within the plurality of cells 18. More specifically, air can flow from the second, third, and fourth zones 34, 38, 42 to the first zone 30. The air flows through the respective conduits 58, 62, 66 to the valve assembly 100, where it is directed through the first conduit 54 to the first zone 30, and then discharged from the cellular cushion 10 through the air valve 70.

The valve assembly 100 shown in FIG. 2 is configured to selectively open or close. In response to being in an open position, the valve assembly 100 is configured to fluidly connect all of the zones 30, 34, 38, 42 through the respective conduits 54, 58, 62, 66. The open position is desired for inflation or deflation of the zones 30, 34, 38, 42 (or the associated air cells 18, shown in FIG. 1). In response to being in a closed position, the valve assembly 100 is configured to fluidly disconnect all of the zones 30, 34, 38, 42. As such, each of the plurality of zones 30, 34, 38, 42 is fluidly isolated such that air cannot travel from one zone 30, 34, 38, 42 to any of the other zones 30, 34, 38, 42 through the respective conduits 54, 58, 62, 66. Stated another way, the valve assembly 100 blocks any such fluid movement between zones 30, 34, 38, 42. An example of the valve assembly 100 is disclosed in U.S. Pat. No. 6,687,936, the contents of which is herein incorporated by reference in its entirety.

FIGS. 3-9 illustrate an example of an embodiment of an improved air valve assembly 200. The air valve assembly 200 is configured to couple to the air passageway 72 (shown in FIG. 2) to facilitate selective inflation and deflation of the plurality of air cells 18 (or inflation and deflation of the at least one inflation zone 30, 34, 38, 42). It should be appreciated that while the illustrated cellular cushion 10 illustrates a plurality of inflation zones 30, 34, 38, 42, the air valve assembly 200 is configured for use with a cellular cushion 10 that includes at least one inflation zone. Stated another way, the air valve assembly 200 can be configured for use with a cellular cushion 10 that includes one inflation zone or two or more inflation zones. Thus, at least one inflation zone can include one inflation zone or a plurality of inflation zones.

Figure 3:
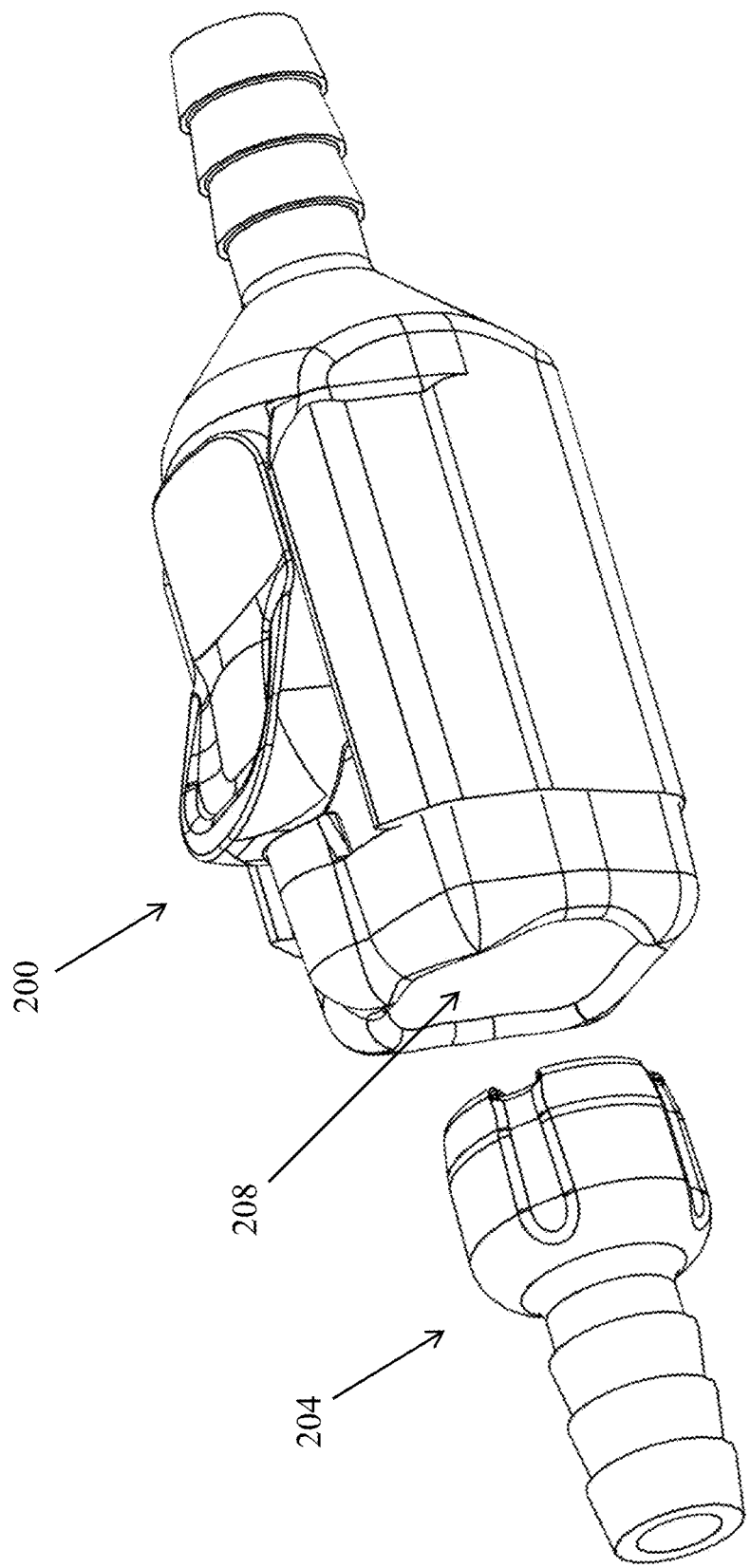
FIG. 3 is a perspective view of an example of an embodiment of an air valve assembly for use with the cellular cushion of FIG. 1 shown detached from the cellular cushion and depicting a first male member in a disconnected configuration.

With specific reference to FIG. 3, the air valve assembly 200 (also referred to as an inflation-deflation valve assembly 200) is configured to engage a first member 204. The first member 204 (also referred to as a male member 204 or first inflation element 204) is configured to be received by the air valve assembly 200, which includes a female portion 208.

Figure 4:
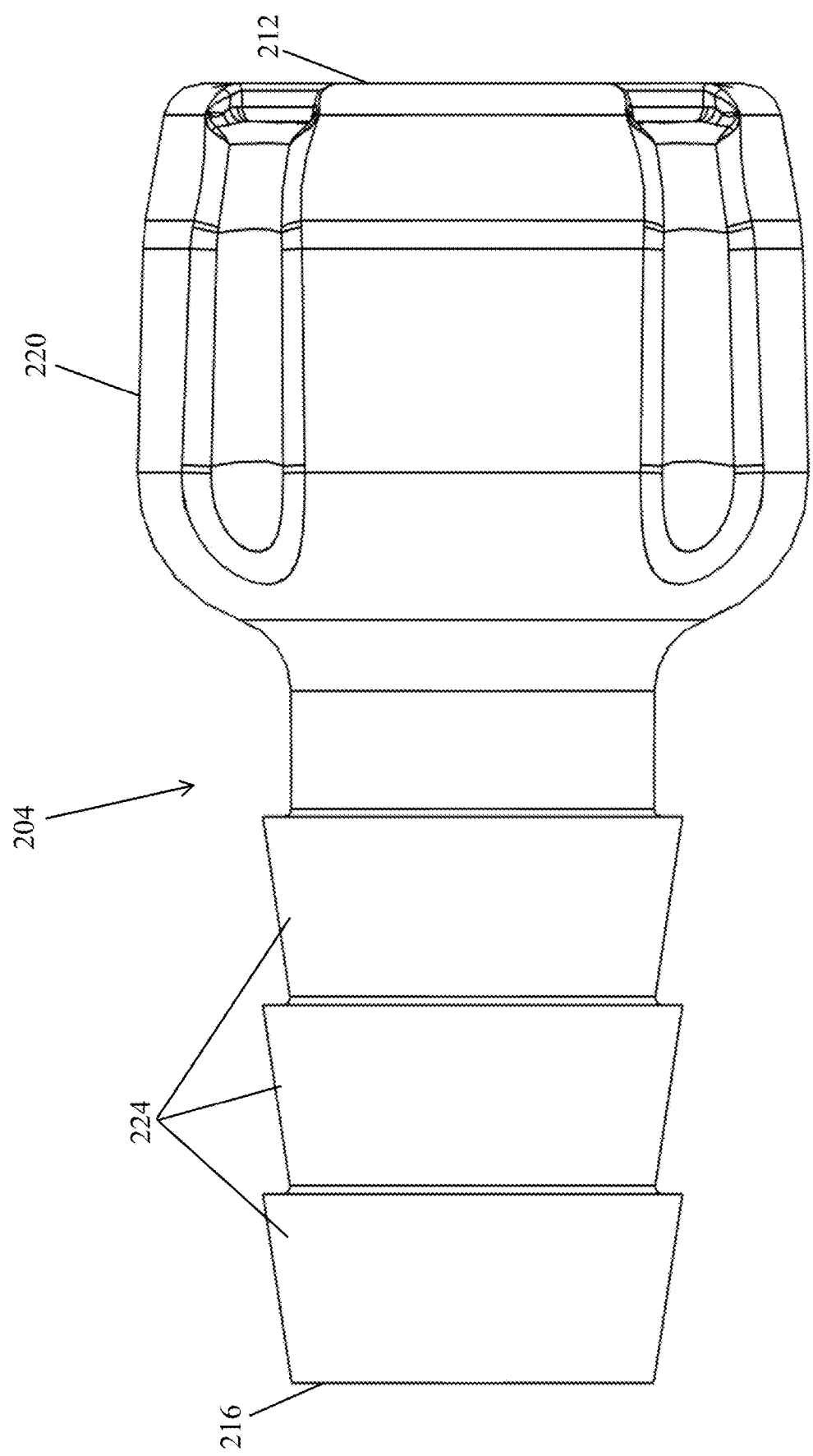
FIG. 4 is a side view of the first male member for use with the air valve assembly in FIG. 3.

With reference now to FIG. 4, the first member 204 includes a first end 212 opposite a second end 216. The first end 212 defines a valve engagement member 220, while the second end 216 defines a plurality of barbs 224. The second end 216 is configured to engage to an air pump (not shown) or other air source to facilitate air flow for inflation. The air pump can be a hand pump, a manual pump, a motorized pump, or any other suitable pump that is configured to supply air to the cellular cushion 10 (shown in FIG. 1). The plurality of barbs 224 can provide frictional engagement with an air supply hose (not shown) to transport air flow from the air pump (not shown) to the valve engagement member 220.

Figure 5:
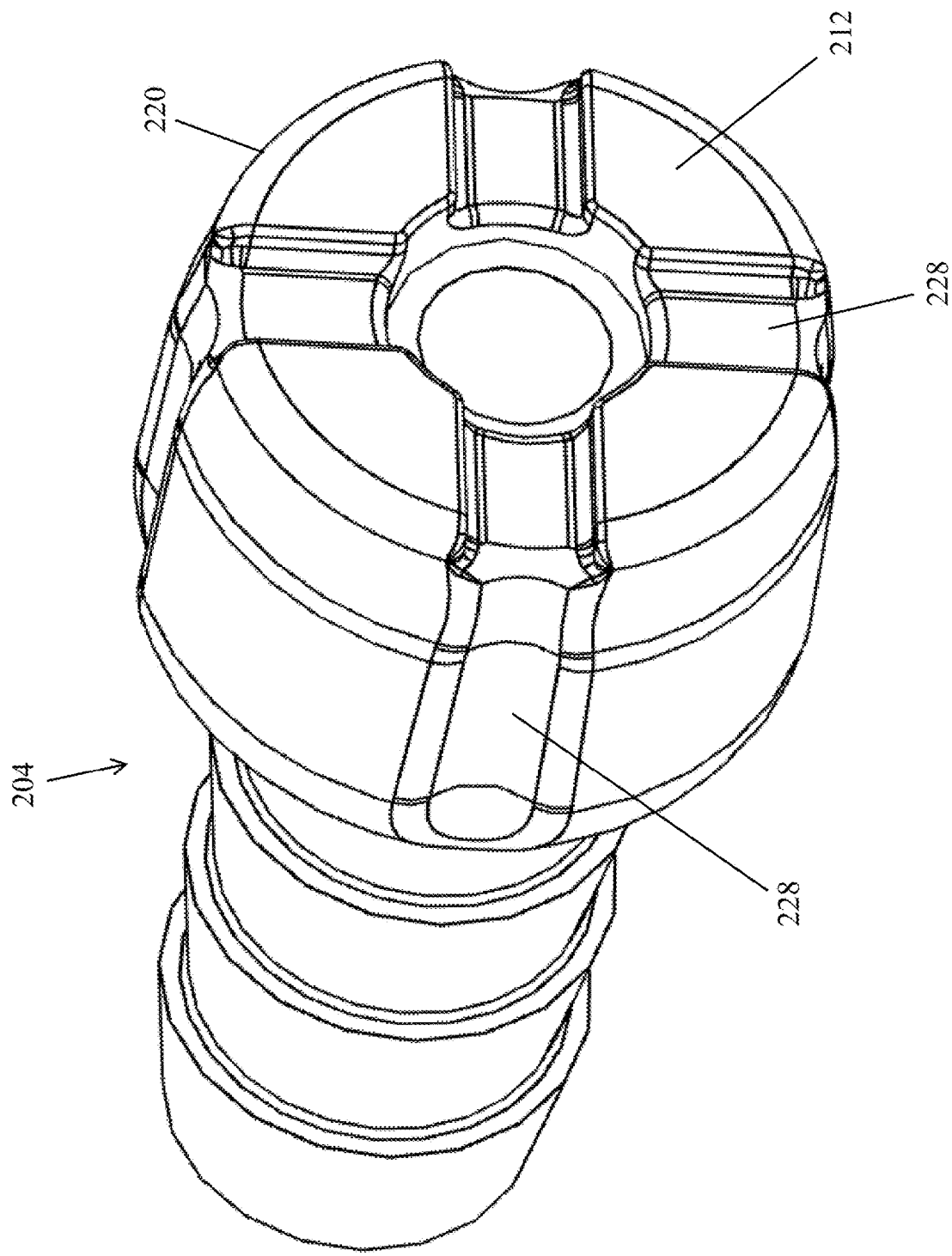
FIG. 5 is a perspective view of the first male member of FIG. 4.
Figure 6:
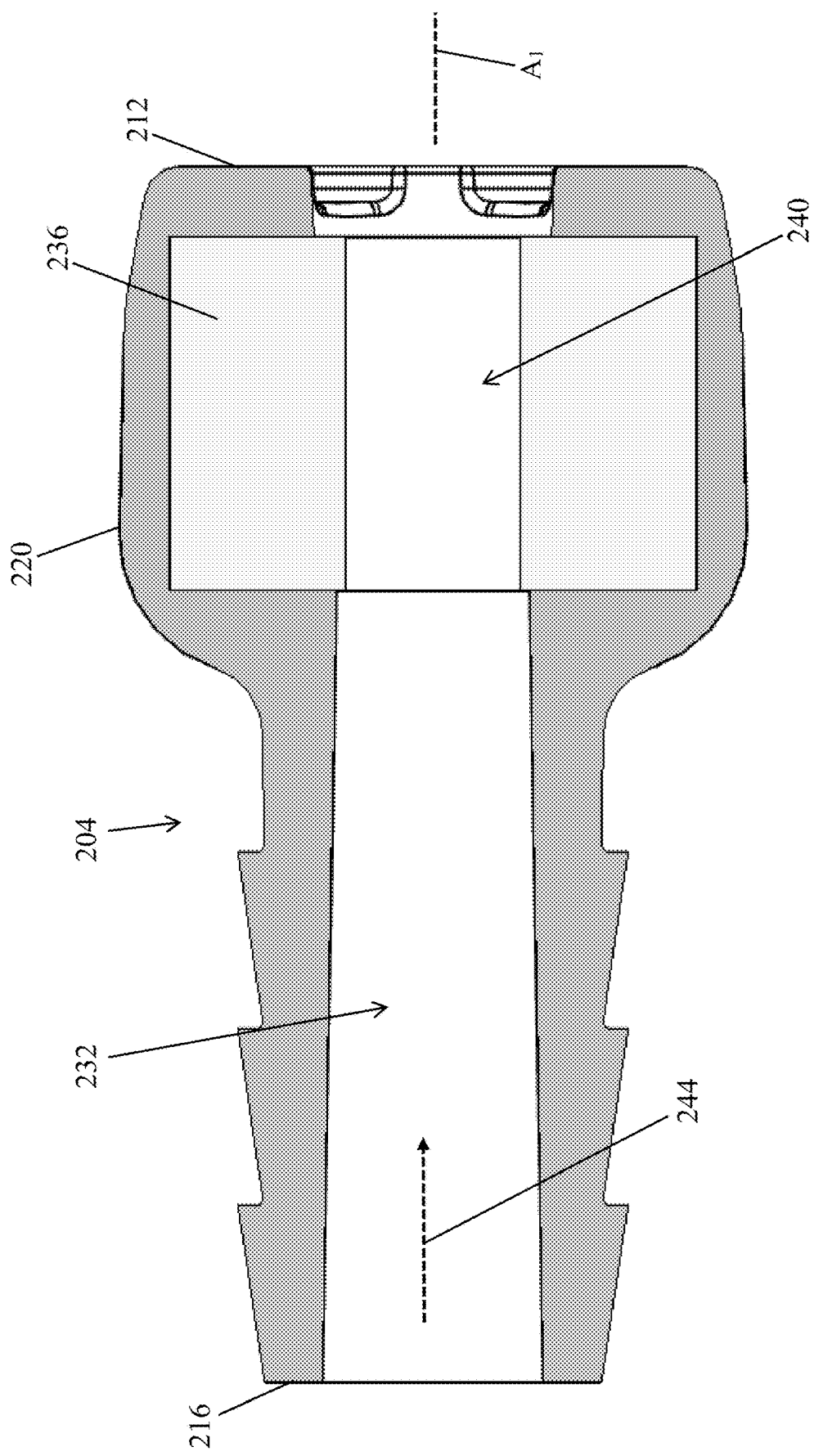
FIG. 6 is a cross-sectional view of the first male member of FIG. 4.

Moving on to FIG. 5, the valve engagement member 220 of the first member 204 can include a keyed geometry to facilitate a complimentary engagement with the female portion 208 of the air valve assembly 200. In these embodiments, to facilitate the keyed engagement the first member 204 includes a geometry that is complimentary to an associated geometry defined by the female portion 208. More specifically, the first member 204 defines a plurality of elongated recesses 228. The elongated recesses 228 are positioned around an outer circumference of the first member 204. In the illustrated embodiment, the first member 204 includes four elongated recessed 228. In other examples of embodiments, the first member 204 can include any suitable number of recesses 228 (e.g., 2, 3, 5, 6 or more, etc.) to facilitate the keyed engagement (or keyed connection) to the female portion 208 of the air valve assembly 200. The plurality of elongated recesses 228 are generally parallel (or generally aligned) with an axis of engagement $A_1$ (or a first axis $A_1$), which is illustrated in FIG. 6. It should be appreciated that the keyed geometry can be an optional feature. In other examples of embodiments, the female portion 208 can be configured to receive a portion of the first member 204, and more specifically the valve engagement member 220 of the first member 204. In these embodiments, the valve engagement member 220 and/or the female portion 208 can have any suitable geometry to facilitate engagement, and further removable receipt of the valve engagement member 220 of the first member 204 by the female portion 208.

With reference now to FIG. 6, the first member 204 defines an air passage 232. The air passage 232 extends entirely through the first member 204 from the first end 212 to the second end 216. The air passage 232 extends along the axis of engagement $A_1$ (or the first axis $A_1$). The valve engagement member 220 also houses a magnetic member 236. The magnetic member 236 defines a central passage 240 (or aperture 240) that is aligned with the air passage 232. Thus, a supply of air 244 (or an airflow 244) travels from the air pump (not shown), through the second end 216 of the first member 204, through the air passage 232 and the central passage 240 of the magnetic member 236, before exiting the first end 212 of the first member 204. In the illustrated embodiment, the magnetic member 236 is an annular magnet. In other examples of embodiments, the magnetic member 236 can have any suitable geometry (square, rectangle, etc.) while also defining the central passage 240 that can be aligned with the air passage 232 to facilitate a flow of air through the first member 204. It should be appreciated that the supply of air 244 (or direction of airflow 244) is generally parallel to the axis of engagement $A_1$ (or the first axis $A_1$).

Figure 7:
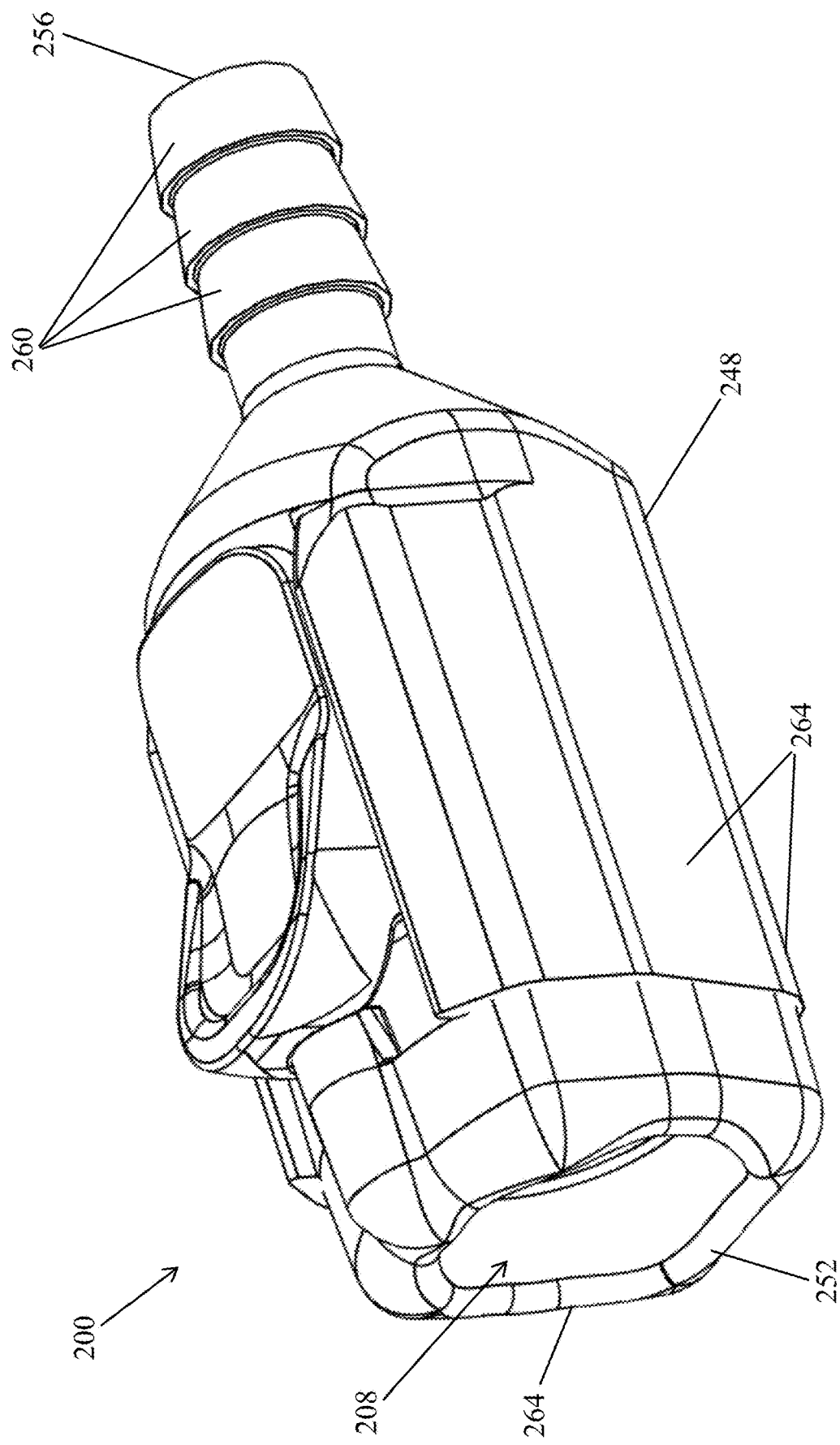
FIG. 7 is a perspective view of the air valve assembly of FIG. 3, with the first male member removed.
Figure 8:
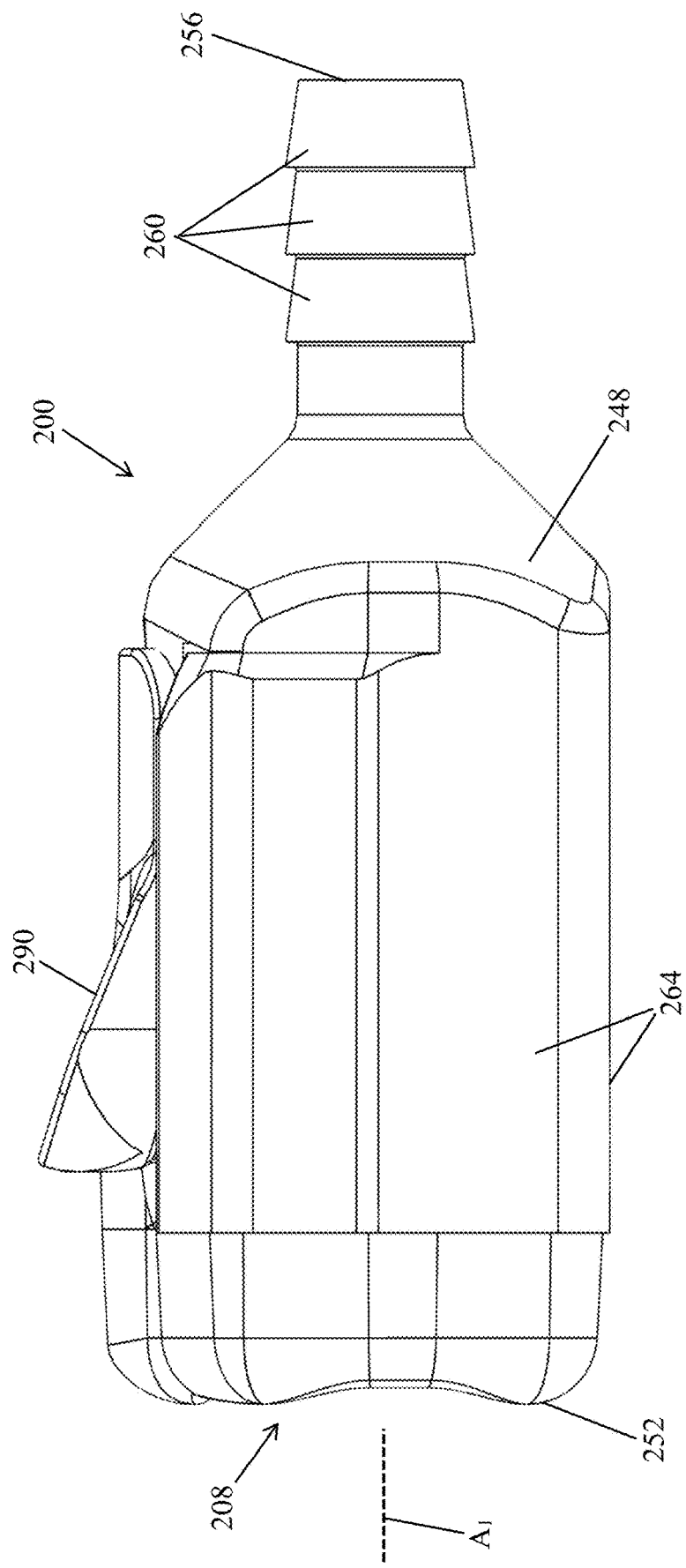
FIG. 8 is a side view of the air valve assembly of FIG. 7.

With reference now to FIGS. 7-8, the air valve assembly 200 includes a housing 248. The housing 248 defines a first end 252 opposite a second end 256. The housing 248 defines the female portion 208 at the first end 252. The second end 256 defines a plurality of barbs 260. The second end 256 is configured to engage to the air passageway 72 (shown in FIG. 2) of the cellular cushion 10 to facilitate inflation and/or deflation of the plurality of air cells 18. The plurality of barbs 260 can provide frictional engagement with the air passageway 72 to transport air flow to or from the plurality of air cells 18 (or the at least one inflation zone 30, 34, 38, 42). The housing 248 defines a plurality sides 264. More specifically, housing 248 generally has a polygonal cross-sectional shape defined by the plurality of sides 264. In the illustrated embodiment, the polygonal cross-sectional shape is generally a pentagon. In other examples of embodiments, the polygonal cross-sectional shape can be triangular, square, rectangular, a hexagon, or any suitable number of sided polygon. The plurality of sides 264 advantageously improve stability of the air valve assembly 200, limiting rotational (or rolling) movement when positioned adjacent to the cellular cushion 10 (such as when positioned on a wheelchair).

Figure 9:
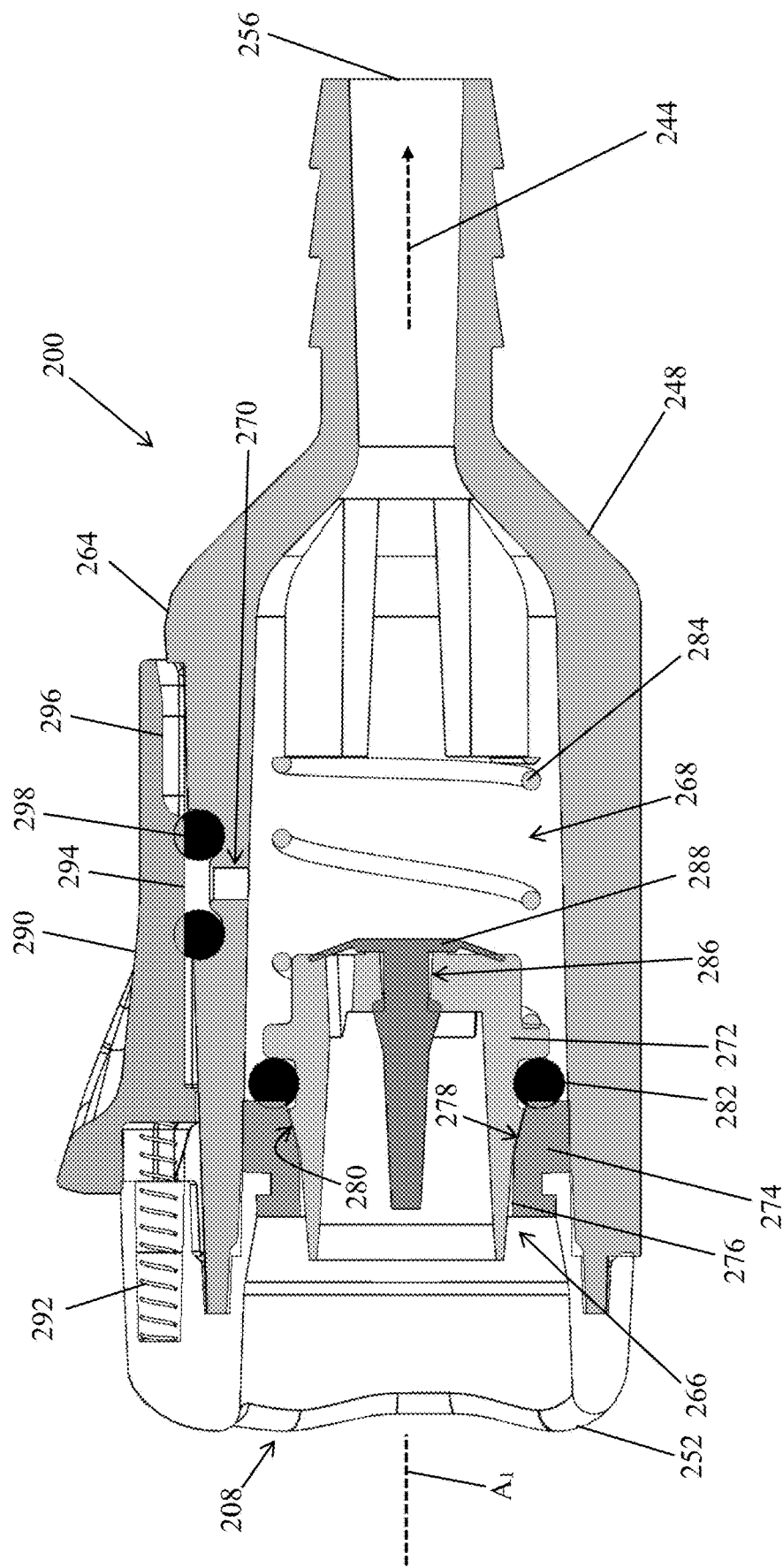
FIG. 9 is a cross-sectional view of the air valve assembly of FIG. 8.

With reference to FIG. 9, the female portion 208 defines a first aperture 266. More specifically, the housing 248 defines the first aperture 266 at the first end 252. The first aperture 266 is sized to slidably receive the first member 204 (shown in FIG. 4). Accordingly, the first aperture 266 has a geometry that is complimentary to the first member 204 in order to facilitate a keyed engagement. The housing 248 also defines an internal channel 268 that extends from the first aperture 266 to the second end 256. Stated another way, the internal channel 268 extends from the first end 252 to the second end 256. The internal channel 268 is configured to selectively allow for a supply of air 244 from the first end 252 through the second end 256. The housing 248 also defines a second aperture 270. The second aperture 270 extends through the sidewall 264 and is fluid communication with the internal channel 268. It should be appreciated that the first aperture 266 can be referred to as an inflation aperture 266 (or a first inflation aperture 266), and the second aperture 270 can be referred to as a deflation aperture 270.

A plunger member 272 is positioned in the internal channel 268 and is configured to selectively seal the first aperture 266. More specifically, the plunger member 272 is configured to slide within the internal channel 268 along the axis of engagement $A_1$ (or the first axis $A_1$). A sealing member 274 is positioned in the internal channel 268 at the first aperture 266. The sealing member 274 defines an aperture 276 (or central passage 276) that is aligned with the internal channel 268. The aperture 276 also includes a sloped surface 278. The plunger member 272 defines a complimentary sloped surface 280 that is configured to engage the sloped surface 278 of the aperture 276 of the sealing member 274. Thus, the plunger member 272 is configured to slide relative to the sealing member 274 to selectively seal the aperture 276 of the sealing member 274. Stated another way, the aperture 276 slidably receives the plunger member 272. It should be appreciated that the aperture 276 and the aperture 268 can be collectively referred to as a first inflation aperture 268. Thus, the sealing member 274 can define (or partially define) the first inflation aperture 268. It should be appreciated that the supply of air 244 (or direction of airflow 244) is generally parallel to the axis of engagement $A_1$ (or the first axis $A_1$).

With continued reference to FIG. 9, in the illustrated example of an embodiment, the sealing member 274 is a magnetic member 274. Further, the magnetic member 274 can be an annular magnet. In other examples of embodiments, the magnetic member 274 can have any suitable geometry (square, rectangle, etc.) while also defining the aperture 276 that is generally aligned with the internal channel 268 to facilitate a flow of air through the air valve assembly 200. It should be appreciated that the magnetic member 274 is configured to attract to the magnetic member 236 of the first member 204. At least one of the magnetic members 236, 274 is a magnet. In one example of an embodiment, one of the first magnetic member 236 or the second magnetic member 274 can be a magnetic member (e.g., magnetized, ferromagnetic, etc.), while the other of the second magnetic member 274 or the first magnetic member 236 can be a metallic member that is not magnetized but is configured to magnetically attract to the magnetic member. Stated another way, one of the magnetic members 236, 274 can be magnetized, while the other of the magnetic members 274, 236 can be non-magnetized but magnetically attracted to the magnetized magnetic member 236, 274. In another example of an embodiment, both the magnetic members 236, 274 can be magnetic members (e.g., magnetized, ferromagnetic, etc.). As such, the combined magnetic members 236, 274 can define a magnetic connection between the air valve assembly 200 and the first member 204. In one example of an embodiment, the magnetic member 236 can be referred to as a first magnetic member 236, while the magnetic member 274 can be referred to as a second magnetic member 274. In another example of an embodiments, the magnetic member 274 can be referred to as a first magnetic member 276, while the magnetic member 236 can be referred to as a second magnetic member 234.

The plunger member 272 can include an annular seal member 282 (or a first seal member). In the illustrated embodiment, the annular seal member 282 is a gasket 282 (e.g., an O-ring, etc.). In addition, a biasing member 284 applies a biasing force onto the plunger member 272 towards a closed position (or a closed configuration), as shown in FIG. 9. Stated another way, the biasing member 284 applies a biasing force onto the plunger member 272 towards engagement with the second magnet 274. Thus, the biasing force directs the plunger member 272 into sealed engagement with the second magnet 274 to seal the first aperture 266. The annular seal member 282 can further assist with sealing the first aperture 266 by further limiting a flow of air between the plunger member 272 and the second magnet 274.

The plunger member 272 also defines a central aperture 286 (or a central channel 286) that extends through the plunger member 272. The central aperture 286 can also be referred to as a second inflation aperture 286 or a third aperture 286. The central aperture 286 carries a seal member 288, illustrated as an umbrella seal 286. The seal member 288 can be referred to as a second seal member 288. In other examples of embodiments, the seal member 288 can be any suitable type of seal to selectively allow and/or block a flow of air through the second inflation aperture 286.

A deflation control member 290 is slidably connected to the housing 248. The deflation control member 290 is configured to slide relative to the housing 248. A second biasing member 292 applies a second biasing force onto the deflation control member 290 to a closed configuration (or a closed position). In the closed position, the deflation control member 290 blocks the second aperture 270, restricting airflow out of the second aperture 270. The deflation control member 290 is configured to slide relative to the housing 248 to overcome the bias applied by the second biasing member 292 to an open position. In the open position (or open configuration or deflation configuration), air is configured to be released out of the second aperture 270. More specifically, the deflation control member 290 defines a first, sealing portion 294 and a second, recessed portion 296 (or a channel portion 296). When transitioning from a closed position (shown in FIG. 9) to the open position, the deflation control member 290 slides relative to the housing 248 in a direction parallel to the first axis $A_1$. The sealing portion 294 moves out of engagement with the second aperture 270, and the recessed portion 296 moves into fluid communication with the second aperture 270. The recessed portion 296 creates a fluid connection with the atmosphere, facilitating a deflation flow of air out of the housing 248 of the air valve assembly 200. A seal 298 can be positioned between the deflation control member 290 and the second aperture 270 to assist with restricting air flow in response to the deflation control member 290 being in the closed position.

In operation, the air valve assembly 200 is configured to operate in a first inflation configuration and a second inflation configuration. In the first inflation configuration, the air valve assembly 200 is configured to receive the first member 204. More specifically, the first member 204 is received by the female portion 208. The magnetic connection is configured to form between the first member 204 and the air valve assembly 200. More specifically, the first magnetic member 236 is attracted to the second magnetic member 274. Once in magnetic engagement, the first end 212 of the first member 204 engages a portion of the plunger member 272 that extends beyond the second magnetic member 274 into the female portion 208. The magnetic connection allows the first member 204 overcome the bias applied by the biasing member 284 onto the plunger member 272. Thus, the first member 204 slides the plunger member 272 relative to the housing 248 along the first axis $A_1$ from a closed position (or a closed configuration), shown in FIG. 9, to an open position (or open configuration). In the open position, the sloped surface 280 of the plunger member 272 slides out of engagement with the sloped surface 278 of the aperture 276 of the second magnetic member 274. This allows air to pass between the sloped surfaces 278, 280, and enter the internal channel 268 from the first end 252. More specifically, air is allowed to travel from the air pump (not shown) through the first member 204, through the first aperture 266, into the internal channel 268, through the second end 256 and into the air passageway 72 to transport air flow to the plurality of air cells 18 (or the at least one inflation zone 30, 34, 38, 42). Once a user inflates the plurality of air cell 18 (or the at least one inflation zone 30, 34, 38, 42) to a targeted or desired inflation level, a user can remove the first member 204 from engagement with the air valve assembly 200. More specifically, the user withdraws the first member 204, disengaging the magnetic connection between the magnetic members 236, 274. As the first member 204 is withdrawn from the female portion 208, the first member 204 no longer engages the plunger member 272 sufficiently to overcome the bias applied by the biasing member 284. As such, the bias applied to the plunger member 272 by the biasing member 284 facilitates sliding movement of the plunger member 272 towards the closed position (or the closed configuration), shown in FIG. 9. The biasing member 284 slides the plunger member 272 relative to the housing 248 along the first axis $A_1$ to the closed position, where the sloped surface 280 of the plunger member 272 is positioned into engagement (or reengagement) with the sloped surface 278 of the aperture 276 of the second magnetic member 274. This restricts the flow of air through the first aperture 266.

In the second inflation configuration, air is configured to enter the internal channel 268 while the first aperture 266 is closed. More specifically, the plunger member 272 is positioned in the closed positioned (or the closed configuration) relative to the second magnetic member 274, as shown in FIG. 9. In this second inflation configuration, a user can blow air into the female portion 208, or the first end 252 of the housing 248, to provide an inflation source. An example is air from the user's mouth. As the user exhales into the first end 252, the air enters the female portion 208. The air is not sufficient to overcome the bias applied by the biasing member 284, thus the plunger member 272 remains in the closed position. However, the air travels through the central aperture 286 of the plunger member 272, where the seal member 288 allows the air to selectively enter the internal channel 268. The air can then travel from the internal channel 268 through the second end 256 and into the air passageway 72 to transport air flow to the plurality of air cells 18 (or the at least one inflation zone 30, 34, 38, 42).

The air valve assembly 200 is also configured to facilitate controlled deflation of the plurality of air cells 18 (or the at least one inflation zone 30, 34, 38, 42). Deflation can occur through the second aperture 270. Stated another way, deflation can be controlled through an aperture separate from the first or second inflation apertures 266, 286. To control deflation, the user slides the control member 290 relative to the housing 248 to overcome the bias applied by the second biasing member 292. As the control member 290 slides, the sealing portion 294 of the control member 290 is moved out of fluid communication with the deflation aperture 270. The recessed portion 296 of the control member 290 is moved into fluid communication with the deflation aperture 270. Air can then travel from the plurality of air cells 18 (or the at least one inflation zone 30, 34, 38, 42), through the air passageway 72, through the second end 256 of the air valve assembly, into the internal channel 268 and through the deflation aperture 270. The discharging air is then directed by the recessed portion 296 to the atmosphere. To terminate deflation, the user can simply release the control member 290. The bias applied by the second biasing member 292 slides the control member 290 such that the sealing portion 294 is placed into fluid communication with the deflation aperture 270, sealing air flow from the deflation aperture 270.

It should be appreciated that during deflation, the control member 290 still overlaps the deflation aperture 270. This protects the air valve assembly 200 from dirt, debris, water, or other contaminants from entering the internal channel 268. Stated another way, in both a closed position and an open position of the control member 290, the control member 290 overlaps the deflation aperture 270.

In addition to the controlled deflation (also referred to as a first deflation configuration) discussed above, the air valve assembly 200 is also configured to operate in a second deflation configuration. In the second deflation configuration, the air valve assembly 200 is configured to receive the first member 204, and air discharges from the plurality of air cells 18 (or the at least one inflation zone 30, 34, 38, 42), through the second end 256 of the air valve assembly 200, through the internal channel 268, through the first aperture 266 and out through the first member 204. In this second deflation configuration, deflation can occur when the air pump (not shown), which is fluidly connected to the first member 204, is not providing an air flow (or not facilitating inflation) to the cellular cushion 10. For example, the second deflation configuration can be used to deflate the cellular cushion 10 in an uncontrolled manner, such as for uninflated storage when not in use.

One or more aspects of the air valve assembly 200 provides certain advantages. For example, the air valve assembly 200 provides for controlled inflation and deflation of a fluidly connected cellular cushion 10. The air valve assembly 200 includes a first inflation configuration, where the air valve assembly 200 is configured to receive a first member 204 fluidly connected to an air pump. The first member 204 is a male member that is easily received by a female portion 208. Further, the male member 204 engages the air valve assembly 200 by a magnetic connection, eliminating cumbersome threaded connections to facilitate inflation. In situations where an air pump is not present, the air valve assembly 200 can be inflated by a second inflation configuration. In the second inflation configuration, a user can blow air into the female portion 208, or the first end 252 of the housing 248, to provide an inflation source. The air valve assembly 200 also includes a deflation control member 290 that is slidably connected to the housing 248. A user can facilitate controlled deflation of the fluidly connected cellular cushion 10 by merely sliding the deflation control member 290 relative to the housing 248. To terminate deflation, the user simply releases the deflation control member 290, where a second biasing member 292 biases the deflation control member 290 to the closed position. The air valve assembly 200 also includes a plurality of sides 264 that advantageously improve stability of the air valve assembly 200. This limits rotational (or rolling) movement when positioned adjacent to the cellular cushion 10, such as when positioned on a wheelchair. These and other advantages are realized by the disclosure provided herein.

What is claimed is:
1. An air valve assembly comprising:
  a housing defining an internal channel;
  a plunger member positioned in the internal channel and configured to slide relative to the housing;

a biasing member positioned in the internal channel and configured to apply a biasing force onto the plunger member;
a sealing member defining a first inflation aperture, the plunger member slidably received by the first inflation aperture;
a second deflation aperture defined by the housing and in fluid communication with the internal channel; and
a deflation control member slidably connected to the housing, the deflation control member configured to selectively seal the second deflation aperture,
wherein the plunger member defines a second inflation aperture, the second inflation aperture receives a second seal member,
wherein in a first inflation configuration, the plunger member is configured to overcome the biasing force and slide relative to the first inflation aperture to facilitate a flow of air between the sealing member and the plunger member, and
wherein in a first deflation configuration, the plunger member is slidably received by the first inflation aperture and the deflation control member slides relative to the housing to discharge air through the second deflation aperture.

2. The air valve assembly of claim 1, wherein the biasing member is a first biasing member, and further comprising a second biasing member configured to apply a biasing force onto the deflation control member.

3. The air valve assembly of claim 2, wherein the deflation control member is biased towards a closed configuration.

4. The air valve assembly of claim 3, wherein in response to overcoming the bias applied by the second biasing member, the deflation control member slides to an open configuration relative to the housing to discharge air through the second deflation aperture.

5. The air valve assembly of claim 1, wherein the deflation control member defines a recessed portion, and in the first deflation configuration the recessed portion is in fluid communication with the second deflation aperture.

6. The air valve assembly of claim 5, wherein the deflation control member defines a sealing portion, and in the first inflation configuration the sealing portion is in fluid communication with the second deflation aperture.

7. The air valve assembly of claim 1, wherein the second seal member is an umbrella seal.

8. The air valve assembly of claim 1, wherein the second inflation aperture is configured to slide with the plunger member in the first inflation configuration.

9. The air valve assembly of claim 1, wherein in a second inflation configuration, the plunger member is slidably received by the first inflation aperture, and the second seal member selectively facilitates a flow of air through the second inflation aperture.

10. The air valve assembly of claim 1, further comprising a female portion defined by the housing, wherein the female portion is configured to receive a first member fluidly connected to an air source, wherein in the first inflation configuration, the first member engages the plunger member to overcome the biasing force and slide relative to the first inflation aperture to facilitate a flow of air between the sealing member and the plunger member.

11. The air valve assembly of claim 10, wherein the first member is configured to form a magnetic connection with the sealing member.

12. The air valve assembly of claim 11, wherein the first member includes a first magnetic member, and the sealing member is a second magnetic member.

13. The air valve assembly of claim 12, wherein at least one of the first magnetic member or the second magnetic member is a magnet.

14. The air valve assembly of claim 12, wherein the first member defines an air passage, and the first magnetic member defines an aperture aligned with the air passage.

15. The air valve assembly of claim 14, wherein the second magnetic member defines the first inflation aperture.

16. The air valve assembly of claim 10, wherein in a second deflation configuration, the first member engages the plunger member to overcome the biasing force and slide relative to the first inflation aperture to facilitate a flow of air between the sealing member and the plunger member.

17. The air valve assembly of claim 16, wherein in the first inflation configuration, air is configured to flow from the air source through the first member between the sealing member and the plunger member, and into the internal channel.

18. The air valve assembly of claim 17, wherein in the second deflation configuration, air is configured to flow from the internal channel between the sealing member and the plunger member, and outward through the first member.

19. The air valve assembly of claim 18, wherein the air valve assembly is configured to be in fluid communication with a cellular cushion defining at least one inflation zone, wherein in response to the first inflation configuration, air flows from the air source through the first member to the internal channel to the at least one inflation zone, and wherein in response to the second deflation configuration, air flows from the at least one inflation zone through the internal channel and outward through the first member.

20. An air valve assembly comprising:
a housing defining an internal channel and a female portion, the female portion is configured to receive a first member fluidly connected to an air source;
a plunger member positioned in the internal channel and configured to slide relative to the housing;
a biasing member positioned in the internal channel and configured to apply a biasing force onto the plunger member;
a sealing member defining a first inflation aperture, the plunger member slidably received by the first inflation aperture;
a second deflation aperture defined by the housing and in fluid communication with the internal channel;
a deflation control member slidably connected to the housing, the deflation control member configured to selectively seal the second deflation aperture; and
wherein in a first inflation configuration, the first member is configured to engage the plunger member to overcome the biasing force and slide relative to the first inflation aperture to facilitate a flow of air between the sealing member and the plunger member, the first member is configured to form a magnetic connection with the sealing member, and
wherein in a first deflation configuration, the plunger member is slidably received by the first inflation aperture and the deflation control member slides relative to the housing to discharge air through the second deflation aperture.

21. The air valve assembly of claim 20, wherein the biasing member is a first biasing member, and further comprising a second biasing member configured to apply a biasing force onto the deflation control member.

22. The air valve assembly of claim 21, wherein the deflation control member is biased towards a closed configuration.

23. The air valve assembly of claim 22, wherein in response to overcoming the bias applied by the second biasing member, the deflation control member slides to an open configuration relative to the housing to discharge air through the second deflation aperture.

24. The air valve assembly of claim 20, wherein the deflation control member defines a recessed portion, and in the first deflation configuration the recessed portion is in fluid communication with the second deflation aperture.

25. The air valve assembly of claim 24, wherein the deflation control member defines a sealing portion, and in the first inflation configuration the sealing portion is in fluid communication with the second deflation aperture.

26. The air valve assembly of claim 20, wherein the first member includes a first magnetic member, and the sealing member is a second magnetic member.

27. The air valve assembly of claim 26, wherein at least one of the first magnetic member or the second magnetic member is a magnet.

28. The air valve assembly of claim 26, wherein the first member defines an air passage, and the first magnetic member defines an aperture aligned with the air passage.

29. The air valve assembly of claim 28, wherein the second magnetic member defines the first inflation aperture.

30. The air valve assembly of claim 20, wherein in a second deflation configuration, the first member engages the plunger member to overcome the biasing force and slide relative to the first inflation aperture to facilitate a flow of air between the sealing member and the plunger member.

31. The air valve assembly of claim 30, wherein in the first inflation configuration, air is configured to flow from the air source through the first member between the sealing member and the plunger member, and into the internal channel.

32. The air valve assembly of claim 31, wherein in the second deflation configuration, air is configured to flow from the internal channel between the sealing member and the plunger member, and outward through the first member.

33. The air valve assembly of claim 32, wherein the air valve assembly is configured to be in fluid communication with a cellular cushion defining at least one inflation zone, wherein in response to the first inflation configuration, air flows from the air source through the first member to the internal channel to the at least one inflation zone, and wherein in response to the second deflation configuration, air flows from the at least one inflation zone through the internal channel and outward through the first member.

* * * * *